Patented July 29, 1924.

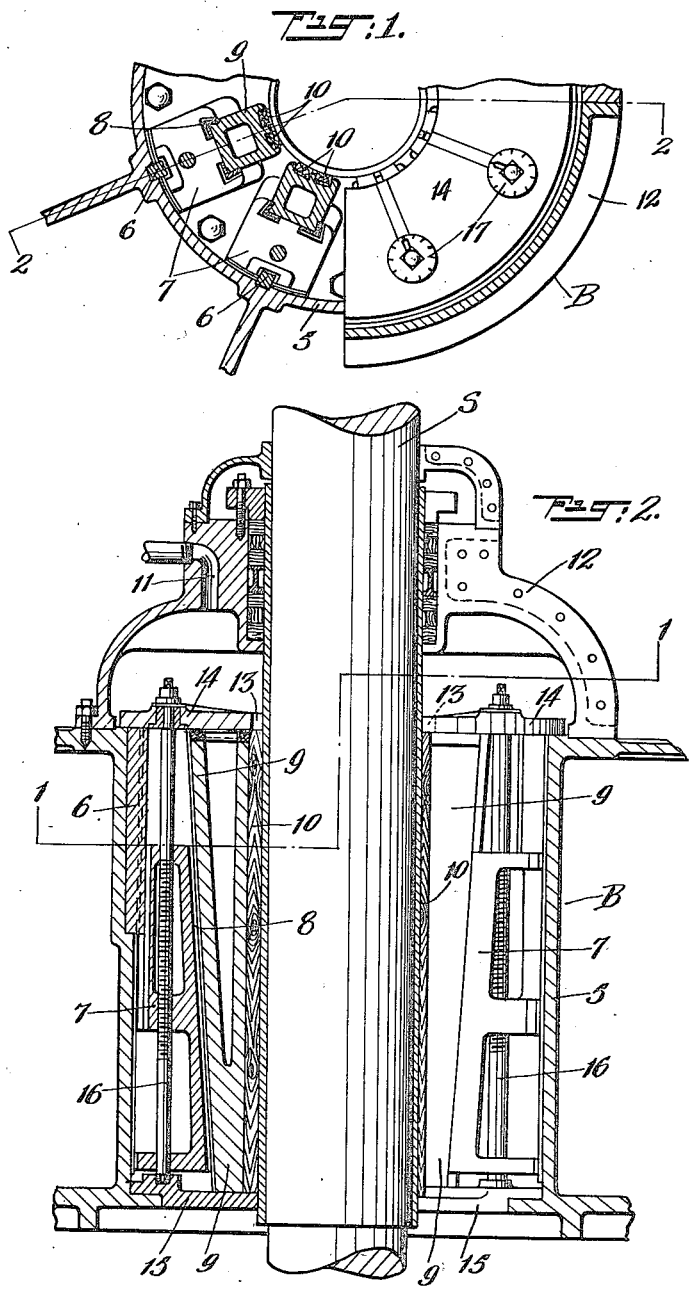

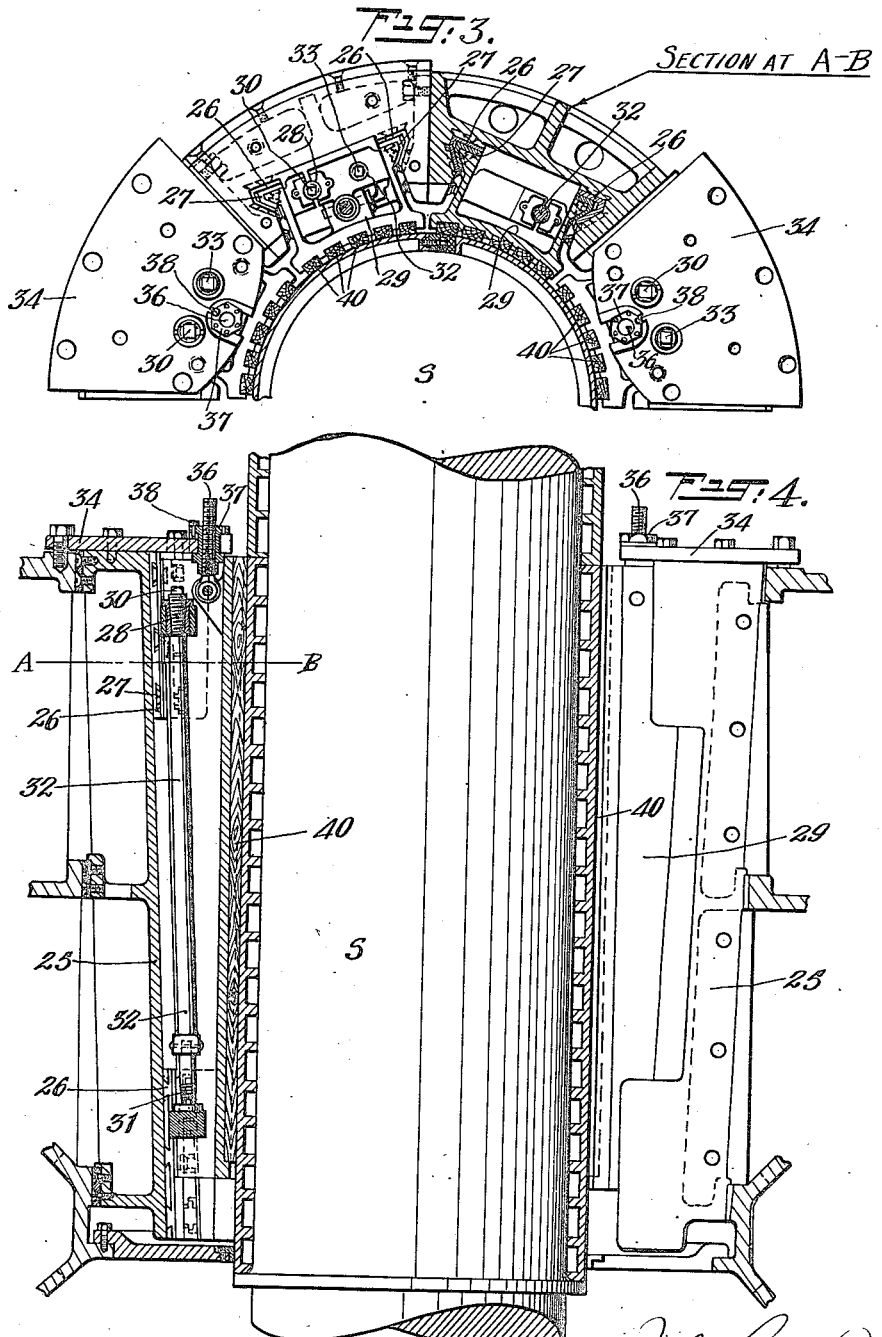

1,503,459

UNITED STATES PATENT OFFICE.

JOHN OVERN, JR., OF PHILADELPHIA, PENNSYLVANIA, ASSIGNOR TO WILLIAM CRAMP & SONS SHIP AND ENGINE BUILDING COMPANY, A CORPORATION OF PENNSYLVANIA.

SHAFT BEARING FOR HYDRAULIC MACHINES.

Original application filed May 13, 1921, Serial No. 469,361. Divided and this application filed November 15, 1923. Serial No. 674,908.

*To all whom it may concern:*

Be it known that I, JOHN OVERN, Jr., a citizen of the United States, residing at Philadelphia, in the county of Philadelphia and State of Pennsylvania, have invented certain new and useful Improvements in Shaft Bearings for Hydraulic Machines, of which the following is a specification.

This invention relates to hydraulic turbines, pumps, etc., and particularly to the shaft bearings therefor. The object of the invention is to provide such a bearing that will be durable in service and adapted to accurately adjust the bearing surfaces to the shaft so as to maintain the desired clearance between the rotatable parts and the surrounding stationary casing.

Further objects of the invention, particularly in the lubrication and adjustment of the bearing will appear from the following description taken in connection with the accompanying drawings, in which, Fig. 1 is a partial horizontal sectional view of a bearing illustrating one embodiment of the invention and taken on the line 1—1 of Fig. 2;

Fig. 2 is a vertical sectional view taken on the line 2—2 of Fig. 1;

Fig. 3 is a partial plan view of a modified form of bearing, and

Fig. 4 is a vertical sectional view of the bearing shown in Fig. 3.

In shaft bearings for turbines and particularly vertical turbines and pumps, it is often advantageous to use bronze, babbitt metal, lignum vitæ, rubber, bakelite or similar anti-friction material in strips for the wearing surfaces. The lateral load is small, being only that due to an unbalance of the rotor parts, and by providing for adjustment of the bearing surfaces to take up unequal wear accurate positioning of the bearing surfaces may be maintained to give the desired running clearance.

In the embodiment of the invention shown in Figs. 1 and 2 the turbine runner has its shaft S provided with a bearing B comprising cylindrical body portion 5 supported for instance, from the turbine head cover in any desired manner. The inner surface of the cylindrical body portion 5 is provided with a series of spaced guide strips or tongues 6 fitting in grooves in wedge blocks 7 sliding vertically on the inner surface of said body portion. The inner faces of the wedge blocks 7 are provided with trackways 8 within which are slidably dovetailed bearing blocks 9 which at their inner faces carry the lignum vitæ bearing strips 10, each block having two or more of said strips firmly held in grooves in the inner faces of the block.

The bearing blocks or holders 9 are spaced apart throughout their length so that the bearing surfaces are entirely open. Lubricating water entering through the opening 11 in the cover and gland support member 12 flows down through the central opening 13 of the annular top plate 14 and is distributed between the bearing strips 10 throughout the length of the bearing. The blocks or holders 9 are of wedge shape and slidable radially in grooves in the upper plate 14 and the lower plate 15 so that any block with its strips 10 may be independently adjusted to take up wear and to center the shaft S. In order to hold and to move these blocks 9 the wedges 7 are provided with the screw shafts 16 journaled in the lower plate 15 and threaded through the wedges 7 and extending through the upper plate 14 to expose their ends for turning to adjust the vertical position of the wedges 7 and correspondingly the radial positions of the bearing blocks 9. Indicators 17 may be provided showing the relative adjustment of these wedges 7 and permitting the radial movement of the bearing blocks to be accurately predetermined.

In the bearing structure shown in Figs. 3 and 4 the outer bearing body or shell 25 is set in place in its supporting means as shown and at its upper end carries a series of cover plates or pieces 34 bolted at their outer portions to the supporting means and fastened intermediate their ends to the body portion 25 of the bearing. The inner surface of the body portion 25 is formed with a series of inclined trackways 26 in which are slidably fitted the slide members 27, 27 of the bearing strip holders or blocks 29. The slide members 27 are dovetailed in the trackways 26 and these slide members are pressed apart and forced into gripping engagement with the trackways by the wedging action of the wedge screws 28, 31. The wedge screw 28 has a head 30 for engagement by a wrench or other tool and the lower wedge screw 31 is extended upward by the shaft 32 provided at its upper end with a similar head 33. Each bearing block 29 is connected to an adjusting bolt 36 threaded through a nut 37 swiveled in the corresponding cover plate 34 so that the turning of the nut will raise or lower the block 29 and due to the inclination of the trackways 26 move said block radially. A pin 38 normally locks the nut 37 against turning.

The bearing blocks 29 are rigidly clamped in place by the wedge action of the wedge screws 28, 31 and also held against vertical displacement by the bolt 36. To adjust a bearing block its wedge screws 28 and 31 are turned in a direction to release the spreading and clamping action exerted on the slide members 27 and, after removing the pin 38 the nut 37 is turned to raise or lower the block according as it is to be moved inward or outward in relation to the center line of the bearing. The pin 38 is then replaced and the wedge screws 28, 31 turned down to spread the slide members 27 and force them into gripping engagement with the trackways 26 so that the bearing blocks are securely held rigid with the body of the bearing.

Each bearing block 29 carries a series of lignum vitæ bearing strips 40, five in number for each block, in the bearing shown in the drawings. The upper ends of the bearing strips are exposed for the entrance of a lubricating liquid into the spaces between the bearing strips so that the bearing is thoroughly lubricated throughout the entire area of the contacting surfaces.

The relatively adjustable bearing blocks of this invention give a very closely fitting and accurate engagement of the bearing surfaces so that the shaft is maintained correctly centered at all times. Any eccentric wear is taken up by the relative adjustment of the bearing blocks so that all of the wearing strips are kept in close engagement with the shaft surfaces. This close adjustment of the bearing surfaces permits a very close alignment of the turbine shaft and the parts rotating with it so that only very small clearances are necessary between these rotating parts and the stationary parts of the turbine.

As to Figs. 1 and 2 this application is a division of my copending application Serial No. 469,361, filed May 13, 1921.

I claim:

1. A bearing for hydraulic machines comprising a plurality of separate adjustable bearing-blocks, each containing a plurality of wearing strips, separated by spaces for the flow of fluid.

2. A bearing for hydraulic machines comprising a plurality of independently adjustable bearing-blocks, each containing a plurality of wearing strips, separated by spaces for the flow of fluid.

3. A bearing for hydraulic machines comprising a plurality of metal bearing-blocks, each containing a plurality of inserted wooden wearing strips, with spaces intervening between the strips for the admission of cooling or lubricating fluid.

4. A bearing for hydraulic machines comprising a plurality of independently adjustable metal bearing-blocks, each containing a plurality of inserted wooden wearing strips, with spaces intervening between the strips for the admission of cooling or lubricating fluid.

5. A bearing for hydraulic machines comprising a body portion forming a stationary support, adjustable bearing blocks between said support and the shaft of the hydraulic machine, inclined surfaces between said block and said support such that a relative vertical movement between said surfaces will adjust said blocks radially, each block containing a plurality of wearing strips.

6. A bearing for hydraulic machines comprising a body portion forming a stationary support, adjustable bearing blocks between said support and the shaft of the hydraulic machine, inclined surfaces between said block and said support such that a relative vertical movement between said surfaces will adjust said blocks radially, and means for independently clamping each block rigidly in place in said support.

7. A bearing for hydraulic machines comprising a body portion forming a stationary support, adjustable bearing blocks between said support and the shaft of the hydraulic machine, inclined surfaces between said block and said support such that a relative vertical movement between said surfaces will adjust said blocks radially, and means for independently clamping each block rigidly in place in said support and means for moving each block axially so as to adjust it radially.

8. A bearing for hydraulic machines comprising a body portion forming a stationary support, adjustable bearing blocks between said support and the shaft of the hydraulic machine, inclined surfaces between said block and said support such that a relative vertical movement between said surfaces will adjust said blocks radially, and means for independently clamping each block rigidly in place in said support comprising co-operating surfaces between said block and said support and wedge means for pressing said surfaces into gripping engagement with each other.

9. A bearing for hydraulic machines comprising a body portion forming a stationary support, adjustable bearing blocks between said support and the shaft of the hydraulic machine, inclined surfaces between said block and said support such that a relative vertical movement between said surfaces will adjust said blocks radially, and means for independently clamping each block rigidly in place in said support comprising cooperating surfaces between said block and said support and screw wedge means for pressing said surfaces into gripping engagement with each other.

10. A bearing for hydraulic machines comprising a body portion forming a stationary support, adjustable bearing blocks between said support and the shaft of the hydraulic machine, inclined surfaces between said block and said support such that a relative vertical movement between said surfaces will adjust said blocks radially, and means for independently clamping each block rigidly in place in said support comprising portions of said block adapted to be pressed apart and means for wedging said portions apart and pressing them into gripping engagement with the surfaces of said support.

11. In a bearing for the shaft of a hydraulic machine the combination with a body portion forming a stationary support, a member adjustably mounted between the support and said shaft, a plurality of axially extending wearing strips carried by said adjustable member with spaces intervening between the strips, bearing surfaces rotating with said shaft and engaging said bearing strips and means for moving said adjustable member to produce relative adjustment between said bearing strips and said bearing surfaces to take up wear.

12. In a bearing for the vertical shaft of a hydraulic machine the combination with a body portion forming a stationary support, a member adjustably mounted between the support and said shaft, a plurality of spaced axially extending wearing strips carried by said adjustable member, a bearing sleeve surrounding and rotating with said shaft and having its periphery engaged by said wearing strips and means for moving said adjustable member to produce relative adjustment between said bearing strips and said sleeve to take up wear.

JOHN OVERN, Jr.